May 2, 1961
M. LEVECQUE ET AL
APPARATUS FOR THE PRODUCTION OF
FIBERS, PARTICULARLY
GLASS FIBERS
2,981,974
Filed March 10, 1958
2 Sheets-Sheet 2
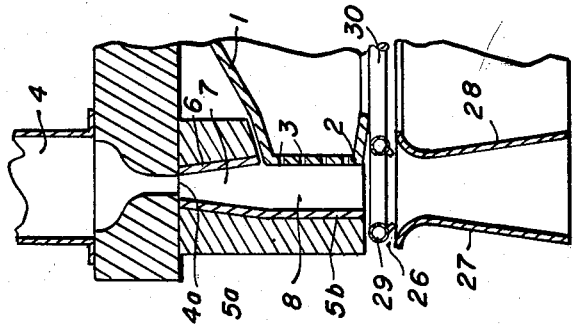
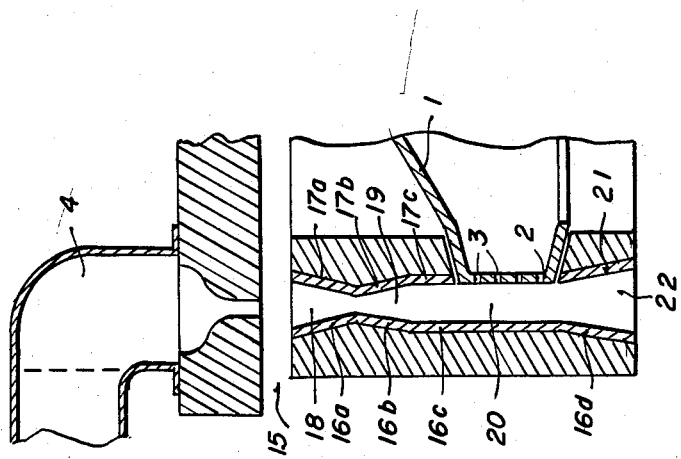
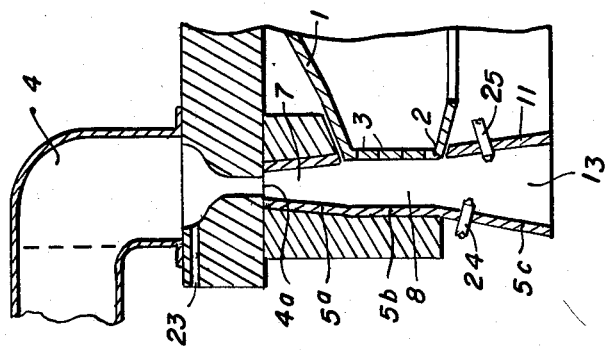
INVENTORS
MARCEL LEVECQUE
MAURICE CHARPENTIER
BY
ATTORNEY

United States Patent Office 2,981,974
Patented May 2, 1961

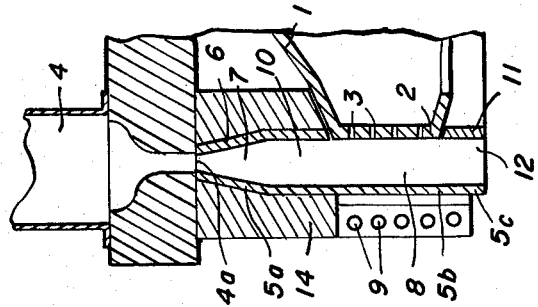
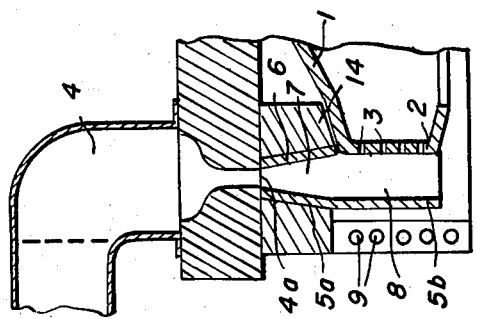
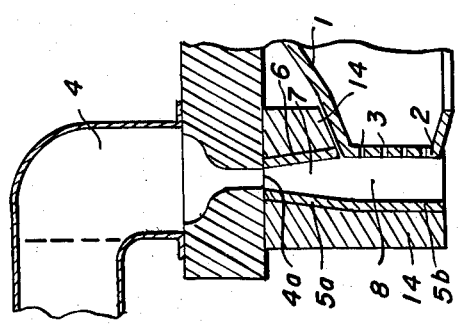

2,981,974
APPARATUS FOR THE PRODUCTION OF FIBERS, PARTICULARLY GLASS FIBERS

Marcel Levecque, Saint-Gratien, and Maurice Charpentier, Rantigny, France, assignors to Societe Anonyme des Manufactures des Glaces & Produits Chimiques de Saint-Gobain, Chauny & Cirey, Paris, France, a corporation of France Filed Mar. 10, 1958, Ser. No. 720,380
Claims priority, application France Mar. 12, 1957
12 Claims. (Cl. 18—2.5)

The present invention relates to an apparatus for manufacturing fibers of thermoplastic materials, particularly glass fibers, in which the material in the melted state, contained in a hollow revolving body, fitted with orifices at its periphery, is projected through these orifices under the action of centrifugal force. In addition, the invention relates especially to the apparatus of this type in which the threads of the material projected through the orifices of the rotating body are subjected to the action of gases which draw out these threads into fine fibers.

It is already known to project the plastic material at high temperature from a centrifuge whose peripheral part, which may assume a cylindrical form, contains a predetermined number of superposed rows of orifices, for example, two to twenty rows, and to subject the projected material, upon its projection from the orifices to the action of gas at high velocity.

In particular, the proposal has been made to subject the threads of plastic material issuing from the orifices, separated according to the superposed rows, to the action of gas at high speed and high temperature which discharge from expansion orifices of an annular combustion chamber, in such a way that the threads undergo an abrupt change in direction and an energetic drawing-out action to transform them into very fine fibers, without the formation of intermediary filaments, whether rigid or very viscous.

In these previous arrangements, it has also been proposed to exert a control on the gas current used for drawing-out the fibers, and in order to effect such control, mechanical means have been devised, for example, particular forms of the peripheral band containing the projection orifices, surfaces suitably placed below the centrifuge or the casings surrounding it, and pneumatic means in the form of gas currents located around the centrifuge or under it.

The invention has for its object the design of an apparatus which makes possible the imposition of a gaseous stream or current upon the threads of material emitted by the centrifuge, in the zone opposite the band with the rows of orifices therein, where these threads are subjected to a rapid drawing-out action, this gaseous current having a critical or sensitive homogeneous temperature in the whole volume of this zone and a speed likewise sensitively uniform at all points of this zone.

The apparatus according to the invention permits the improvement of the control of the gas currents acting on the glass threads and to exert this control notably from the time the gas current leaves the orifices up to at least the last row of projection orifices, so as to treat in practically identical fashion all the glass threads issuing from the projection orifices, and thereby to decrease very perceptibly the breaking up of the threads and fibers into different diameters and lengths. In addition, this results in the production of fibers with good mechanical qualities, particularly a good resistance to traction.

The above advantageous results are obtained even by the use of a centrifuge with a large number of rows of projection orifices on its periphery.

According to one embodiment of the invention, the gas current is made to pass into an organ located between the emission orifice of the gas current and the upper part of the band containing the projection orifices, which channels it up to the level of the first row of orifices, allowing its expansion and spread protected from any disturbing gas current, notably from any induced air current, and carrying at its lower outer part an annular crown encircling the centrifuge, which crown is located opposite the different rows of a projection orifices and extending at least up to the last row of these orifices.

Conforming to the invention, the gas current at high speed and high temperature takes up practically the contour of the organ located between the exit orifice of the combustion chamber and the first row of projection orifices for the melted material, so as to avoid any parasitic movement inside this organ capable of arising from the induction of outside air. This effect is enhanced by the fact that the expansion of the gas current at the zone in contact with the line of union between this organ and the peripheral wall or band of the centrifuge is a zone under pressure, which avoids all possibility of re-entry of induced air. In addition, the method according to the invention permits the gaseous current which occupies the whole volume or spaces which is open to it, namely, the entire zone facing the band with the projection orifices for the melted material, to remain in contact with the peripheral band containing the orifices over the entire height of the band.

According to another characteristic of the invention, it is possible to attain a strong tempering of the fibers after their departure from the zone surrounding the peripheral band. For this purpose, it has been proposed to arrange at the exit of this zone, means of cooling, such as for example, cold gas currents, atomization of liquids, etc., directed against the fibers. According to one embodiment of the invention, the fibers may be carried into the presence of an appreciable quantity of induced air, inside an organ channeling the gas current, for example, an organ whose section may be in the form of Venturi, which is placed at the exit from the annular zone surrounding the peripheral band.

Moreover, it has been established that if the gas current must necessarily have a high speed at the moment it comes in contact with the threads projected from the projection orifices of the centrifuge, it is necessary to control its temperature carefully, notably to avoid too high a temperature capable of harming the mechanical resistance of the fibers. With this in mind, the invention provides for mixing a carefully controlled quantity of cold gas with the gas issuing from the combustion chamber, before it penetrates into the organ wherefrom it expands up to the peripheral band containing the projection orifices.

According to one characteristic of the invention, the arrangements in accordance therewith comprise a passage permitting the gas current to be directed in a channeled circuit, from the blower orifice up to at least the last row of projection orifices without the slightest disturbance from the outer atmosphere, notably without the intervention of induced air currents.

Conforming to the invention, this passage permits a channelization of increasing cross-section in the direction of the propagation of the gas current up to and bordering upon an annular channel of practically constant cross-section surrounding the peripheral band of the centrifuge over the entire height of this band.

These arrangements can be associated advantageously with devices proposed previously in order to act upon the direction of hot gases after their passage through the zone located opposite the projection orifices.

Thus, they can be associated with all mechanical or pneumatic organs located beneath the centrifuge and aimed at controlling the flow and output of the gas current carrying the fibers, particularly to prevent re-grouping of the fibers underneath the centrifuge.

Hereinafter are described by way of example, forms of realization of devices according to the invention, wherein—

Fig. 1 is a vertical sectional view of a preferred embodiment of the invention;

Fig. 2 is a vertical sectional view of a second embodiment of the invention which incorporates, in addition, electrical heating means for controlling the temperature of the peripheral band containing the projection orifices;

Fig. 3 is a vertical sectional view of a variation of the embodiment shown in Fig. 2 featuring an extension of the gaseous fluid channel of constant cross-section above and below the peripheral band of the centrifuge;

Fig. 4 is a vertical sectional view of a different embodiment of the invention from that shown in Fig. 1 and incorporating a control of the temperature of the gas blast as well as an extension of the gaseous channel of constant cross-section beyond the centrifuge to prevent re-grouping of the fibers entrained in the gas stream and to effect tempering thereof;

Fig. 5 is a vertical sectional view of a different embodiment of the invention from that shown in Fig. 4 for controlling the temperature of the gas current, and effecting the homogenization of the gas stream in the channel adjacent to the peripheral wall of the centrifuge; and Fig. 6 is a vertical sectional view of another arrangement for tempering the glass fibers following their drawing out and for preventing their re-grouping or entanglement.

In the figures of the attacked drawings, the hollow rotating body 1 includes a peripheral band 2 provided with orifices 3 through which the melted material is projected in the form of threads. The band 2 may have a predetermined number of superposed rows of orifices 3, for example, two to twenty rows.

In the forms of realization represented in the figures, the gaseous fluid at high temperature and high velocity issues from a combustion chamber 4. This chamber is in the form of a ring or crown and has a continuous circular slot 4a concentric with the centrifuge through which the fluid gas issues.

In the form of realization shown in Fig. 1, the passage designed to channel the gaseous fluid, from the blower slot 4a to at least the lowermost row 3 of the projection orifices, comprises on the one hand an exterior wall formed by an inclined part 5a and a cylindrical part 5b, and on the other hand, an interior wall 6 also inclined. The elements 5a and 5b form between them a channel 7 of section increasing in the direction of the propagation of the gas current while the element 5b forms with the band of the rotating body an annular channel 8 of practically constant horizontal cross-section over the entire height of said band. In this zone of constant section, the gas current has at all points practically equal temperature and velocity. This gas current acts then in identical fashion on all the threads issuing from the projection orifices.

It will be noted that, due to the pressure of the fluid gas at the exit from the divergent channel 7, the small section which may be left free between the lower edge of the wall 6 and the top of the band 2 of the centrifuge can give rise to only a flow, moreover weak, of fluid from the inside of the passage toward the outside. All induced air currents are therefore eliminated.

The elements making up the passage may be of any suitable refractory material. All these elements may be advantageously provided with a refractory lining 14.

Fig. 2 shows an apparatus similar to that of Fig. 1, but which has an electrical winding 9 through which passes a high frequency current to heat the peripheral band 2 by induction to maintain it at the desired and suitable temperature.

In the embodiment illustrated in Fig. 3, the passage comprises a divergent channel 7 to which a channel of constant horizontal cross-section 10 forms a continuation above the annular channel 8 surrounding the peripheral band 2. This embodiment allows increased homogenization of temperature and speed of the current of gaseous fluid admitted into annular channel 8.

In addition there has been provided an extension of the exterior wall of the passage 8 by a part 5c as well as a wall 11 placed concentric thereto form a channel 12, extending channel 8 so as to direct the gas current carrying the fibers as well as the fibers themselves. Wall 11 may be integral with the rotating body 1.

In the embodiment shown in Fig. 4, the annular channel 10 of the arrangement shown in Fig. 3 is eliminated, and at the exit of the passage 8, a channel 13 is provided with increasing horizontal section formed by diverging walls 5c and 11.

An admission of air can be provided in 23 in the vicinity of the exit of the combustion chamber 4 for the gaseous fluid in order to decrease the temperature of the combustion gas and to regulate that temperature.

Fig. 5 shows another embodiment of the invention in which the gas current issuing from the combustion chamber is mixed with the air arriving laterally at 15. This introduction of air may be regulated in order to give to the resultant gas current, passing into the passage, the desired temperature. This passage has two walls whose opposing parts 16a—17a are inclined to form a channel 18 with decreasing section and whose inclined opposing parts 16b—17b then form a channel 19 with increasing section in the direction of gas flow. This channel 19 is prolonged by a channel 20 of constant horizontal section formed by the vertical parts 16c—17c. This channel 20 covers the entire height of the peripheral band 2 as well as a part of the passage located upstream. Finally, part 16d and wall 21 form a channel 22 with increasing section at the exit of channel 20.

According to the invention, tempering of the fibers may be effected in a zone located below the rotating body, or downstream of the gaseous current.

In the embodiment shown in Fig. 4, tempering is accomplished by means of atomization of liquid produced by nozzles 24 and 25 traversing respectively walls 5c and 11.

In the embodiment shown in Fig. 6, the tempering of the fibers is obtained by means of induced air penetrating into the gas current through gap or space 26 left open between the passage at the exit of channel 8 and the annular skirts 27—28 forming between them a divergent channel.

Likewise, the introduction of fluid, gas or liquid, may be effected by means of nozzles or crowns 29—30 provided with blower orifices.

We claim:

1. An apparatus for the production of fine fibers from heated viscous thermoplastic material comprising a centrifugal body rotatable about a vertical axis with a peripheral wall of substantial height provided with a plurality of superposed rows of orifices for the discharge of the heated viscous material from the interior part of the body by centrifugal force, an annular passage of limited substantially uniform cross-section surrounding said peripheral wall, and annular nozzle means for directing transversely a heated gaseous blast into said passage to fill said limited passage completely therewith and to draw out the fibers discharged through said orifices, said blast being of substantially constant temperature and velocity at all levels of said rows of orifices.

2. An apparatus for the production of fine fibers from heated viscous thermoplastic material comprising a centrifugal body rotatable about a vertical axis with a peripheral wall of substantial height provided with a plurality of superposed rows of orifices for the discharge of the heated viscous material from the interior part of the body by centrifugal force, an annular passage of limited substantially uniform cross-section surrounding said peripheral wall, a blower orifice above said annular passage, and an annular chamber with divergent walls for conducting a highly heated gaseous blast from said blower orifice to fill said limited passage completely so that the gaseous blast entering and leaving said passage is of substantially constant temperature and velocity to effect a uniform entrainment of the fibers issuing from all of the superposed rows of orifices in said peripheral wall.

3. An apparatus for the production of fine fibers from heated viscous thermoplastic material comprising a centrifugal body rotatable about a vertical axis with a vertical peripheral wall of substantial height provided with a plurality of superposed rows of orifices for the discharge of the heated viscous material from the interior part of the body by centrifugal force, a circular blower orifice above and beyond said peripheral wall, a fixed annular external wall surrounding said centrifugal body below said blower orifice and having at least the portion opposite said peripheral wall parallel and concentric thereto to define an annular passage of limited substantially constant cross-section adjacent to all of said superposed rows of orifices, and a fixed annular internal wall between said peripheral wall and blower orifice having at least a portion thereof inclined to the vertical and complemental to an opposed portion of said first wall to define an annular nozzle of divergent cross-section opening into said passage of substantially constant cross-section to permit the highly heated gaseous blast emanating from said blower orifice to expand in said last-mentioned passage and to traverse all superposed rows of orifices at substantially constant temperature and velocity to effect a uniform entrainment of the fibers issuing therefrom.

4. An apparatus as set forth in claim 3 wherein the spacing between the bottom edge of said annular internal wall and the top of said peripheral wall is minimal to block extraneous disturbing air currents from said annular passage of substantially constant cross-section.

5. An apparatus as set forth in claim 3 wherein said fixed annular external wall extends below the level of the peripheral wall of the centrifugal body, and an extension of said annular internal wall below the level of said peripheral wall cooperating therewith to lead away the fibers entrained by said gaseous blast at said passage of substantially constant cross-section.

6. An apparatus as set forth in claim 3 including means for tempering the fibers following their exit from the passage of substantially constant cross-section adjacent to said peripheral wall.

7. An apparatus as set forth in claim 3 including an induction heating coil surrounding said fixed annular external wall for heating the peripheral wall of the centrifugal body with high frequency current.

8. An apparatus for the production of fine fibers from heated viscous thermoplastic material comprising a centrifugal body rotatable about a vertical axis with a vertical peripheral wall of substantail height provided with a plurality of superposed rows of orifices for the discharge of the heated viscous material from the interior part of the body by centrifugal force, a combustion chamber, a circular blower orifice above and beyond said peripheral wall communicating with said combustion chamber, a fixed annular external wall surrounding said centrifugal body below said blower orifice and having at least the portion opposite said peripheral wall parallel and concentric thereto to define an annular passage of limited substantially constant cross-section adjacent to all of said superposed rows of orifices, a fixed annular internal wall between said peripheral wall and blower orifice having at least a portion thereof inclined to the vertical and complemental to an opposed portion of said first wall to define an annular nozzle of divergent cross-section opening into said passage of substantially constant cross-section to permit the highly heated gaseous blast emanating from said blower orifice to expand in said last-mentioned passage and to traverse all superposed rows of orifices at substantially constant temperature and velocity to effect a uniform entrainment of the fibers issuing therefrom, and means in advance of said annular nozzle for mixing a predetermined quantity of cold gas with the hot gas furnished by said combustion chamber to control critically the temperature of the gaseous blast in said annular passage of substantially constant cross-section.

9. An apparatus as set forth in claim 8 wherein said last-mentioned means comprises a lateral air inlet communicating with said blower orifice.

10. An apparatus as set forth in claim 8 wherein said fixed annular external wall and annular internal wall include complemental opposed portions adjacent to said blower orifice which define an annular nozzle of convergent cross-section for enhancing intermixture and rapid flow of the gaseous blast before encountering the fibers issuing from the peripheral wall of the centrifugal body.

11. An apparatus as set forth in claim 2 including a diverging Venturi chamber below said annular passage for leading away the fibers entrained by the gaseous blast, and means for tempering the fibers passing through said last-mentioned chamber.

12. An apparatus as set forth in claim 11 wherein said last-mentioned means comprises concentric circular conduits adjacent to the inlet of said Venturi chamber, and inwardly directed blower nozzles spaced along said conduits for delivering cooling fluids therethrough.

References Cited in the file of this patent

UNITED STATES PATENTS

| | | |
|---|---|---|
| 2,318,244 | McClure | May 4, 1943 |
| 2,431,205 | Slayter | Nov. 18, 1947 |
| 2,578,101 | Stalego | Dec. 11, 1951 |
| 2,582,561 | Peyches | Jan. 15, 1952 |
| 2,609,566 | Slayter et al. | Sept. 9, 1952 |
| 2,624,912 | Heymes et al. | Jan. 13, 1953 |

FOREIGN PATENTS

| | | |
|---|---|---|
| 202,877 | Australia | July 5, 1956 |
| 1,124,487 | France | July 2, 1956 |
| 1,124,489 | France | July 2, 1956 |